United States Patent
Hu et al.

(10) Patent No.: US 11,187,855 B1
(45) Date of Patent: Nov. 30, 2021

(54) OPTICAL CABLE FIXTURE, FIBER OPTIC CONNECTOR, AND FIBER OPTIC CONNECTOR MANUFACTURING METHOD

(71) Applicant: Fujin Precision Industrial (Jincheng)Co., Ltd., Jincheng (CN)

(72) Inventors: Jian-Wei Hu, Shenzhen (CN); Yao Li, Newark, CA (US); Jian-Bo Yang, Jincheng (CN)

(73) Assignee: Fujin Precision Industrial (Jincheng)Co., Ltd., Jincheng (CN)

( * ) Notice: Subject to any disclaimer, the term of this patent is extended or adjusted under 35 U.S.C. 154(b) by 0 days.

(21) Appl. No.: 16/891,669

(22) Filed: Jun. 3, 2020

(30) Foreign Application Priority Data

May 12, 2020 (CN) .......................... 202010396580.6

(51) Int. Cl.
*G02B 6/25* (2006.01)
*G02B 6/255* (2006.01)
*G02B 6/12* (2006.01)

(52) U.S. Cl.
CPC .............. *G02B 6/255* (2013.01); *G02B 6/25* (2013.01); *G02B 6/2558* (2013.01); *G02B 2006/12192* (2013.01)

(58) Field of Classification Search
CPC ........ G02B 6/25; G02B 6/255; G02B 6/2558; G02B 2006/12192
See application file for complete search history.

(56) References Cited

U.S. PATENT DOCUMENTS

| | | | | |
|---|---|---|---|---|
| 5,524,167 A * | 6/1996 | Ewert | ...................... | G02B 6/25 385/137 |
| 6,033,124 A * | 3/2000 | Lesueur | ............... | G02B 6/3809 385/53 |
| 6,439,780 B1 * | 8/2002 | Mudd | .................. | G02B 6/3807 385/83 |
| 7,438,485 B2 * | 10/2008 | Tabata | ................ | G02B 6/2551 385/134 |
| 7,546,020 B2 * | 6/2009 | Honma | .................. | G02B 6/255 385/137 |
| 7,848,609 B2 * | 12/2010 | Meitzler | .............. | G02B 6/2555 385/137 |
| 7,901,147 B1 * | 3/2011 | de Jong | ............... | G02B 6/3846 385/95 |
| 7,934,874 B2 * | 5/2011 | Honma | ................ | G02B 6/3846 385/97 |
| 8,826,517 B2 * | 9/2014 | Leyva, Jr. | ............ | G02B 6/3616 29/700 |
| 8,861,920 B2 * | 10/2014 | Sato | ..................... | G02B 6/2553 385/137 |
| 9,004,781 B2 * | 4/2015 | Homma | ............... | G02B 6/2558 385/99 |
| 9,235,005 B2 * | 1/2016 | Sato | ..................... | G02B 6/2555 |
| 9,541,710 B2 * | 1/2017 | Sasaki | ...................... | G02B 6/25 |
| 9,720,185 B2 * | 8/2017 | Halls | ........................ | G02B 6/25 |

(Continued)

*Primary Examiner* — Ryan A Lepisto
(74) *Attorney, Agent, or Firm* — ScienBiziP, P.C.

(57) ABSTRACT

An optical cable fixture includes a base and a cover. The base defines a receiving groove penetrating opposite sides of the base. The receiving groove includes a first receiving portion and a second receiving portion. The first receiving portion receives an optical cable. The second receiving portion receives first optical fibers extending from the optical cable. The cover covers the base and fixes the optical cable and the first optical fibers.

11 Claims, 9 Drawing Sheets

(56) References Cited

U.S. PATENT DOCUMENTS

| | | | |
|---|---|---|---|
| 10,585,244 B2* | 3/2020 | Mori | G02B 6/2555 |
| 10,921,527 B2* | 2/2021 | Sato | G02B 6/24 |
| 2002/0130152 A1* | 9/2002 | Cripps, Jr. | G02B 6/25 |
| | | | 225/105 |
| 2018/0074261 A1* | 3/2018 | Burek | G02B 6/4403 |
| 2018/0284353 A1* | 10/2018 | Zhao | G02B 6/2551 |

* cited by examiner

OPTICAL CABLE FIXTURE, FIBER OPTIC CONNECTOR, AND FIBER OPTIC CONNECTOR MANUFACTURING METHOD

FIELD

The subject matter herein generally relates to fiber optic technology, and more particularly to an optical cable fixture, a fiber optic connector, and a fiber optic connector manufacturing method.

BACKGROUND

When optical fibers are spliced, multiple optical fibers need to be manually positioned one-by-one. At present, the optical fibers are positioned by glue, tape, or a heat-shrinkable tube, and then the optical fibers are thermally stripped and spliced. However, glue and tape are easy to contaminate the optical fibers, the operation of glue, tape, and the heat-shrinkable tube is complicated, and the assembly cost is high.

BRIEF DESCRIPTION OF THE DRAWINGS

Implementations of the present disclosure will now be described, by way of embodiments, with reference to the attached figures.

DETAILED DESCRIPTION

Figure 1:
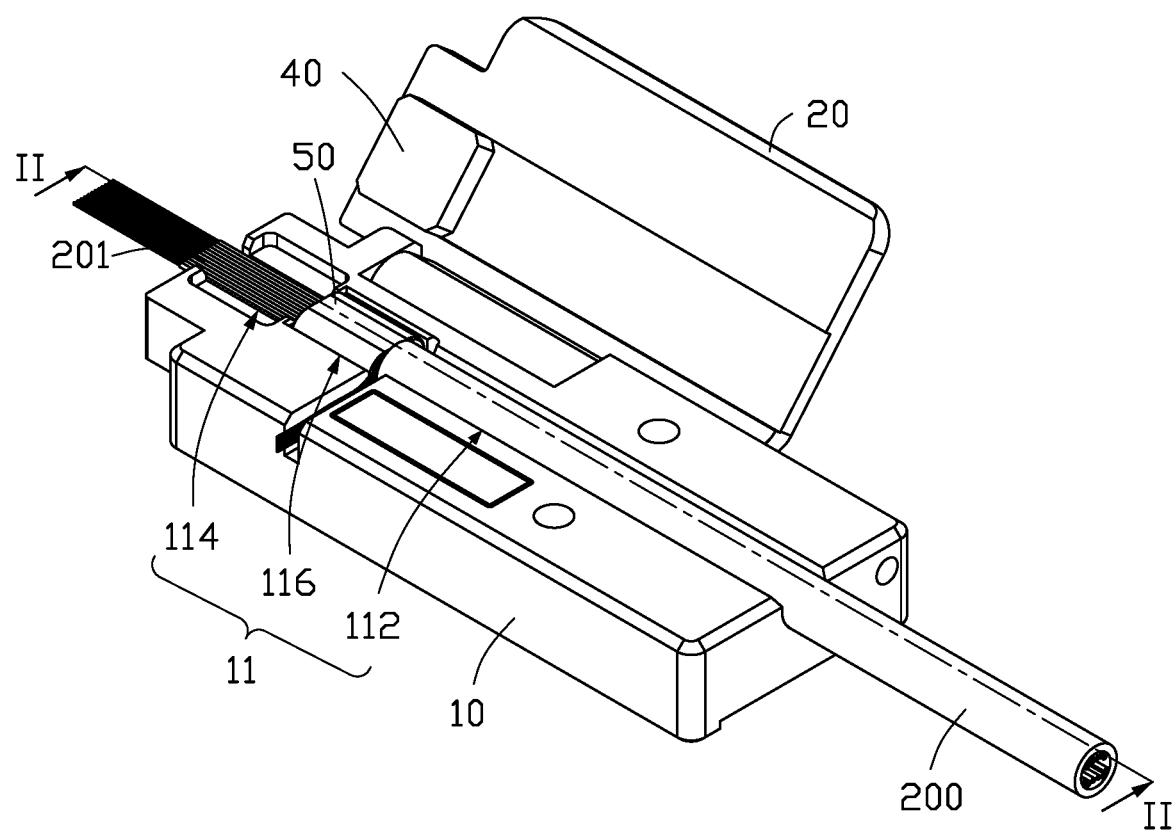
FIG. 1 is a schematic perspective view of an optical cable fixture and an optical cable according to a first embodiment.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Referring to FIG. 1, a first embodiment of the present disclosure provides an optical cable fixture 100. The optical cable fixture 100 is used to fix an optical cable 200 to sorting and stripping an optical fiber ribbon. The optical cable 200 includes a plurality of first optical fibers 201.

The optical cable fixture 100 includes a base 10 and a cover 20. The base 10 defines a receiving groove 11. The receiving groove 11 includes a first receiving portion 112 and a second receiving portion 114 communicating with each other. The first receiving portion 112 penetrates one end of the base 10. The second receiving portion 114 penetrates the other end of the base 10. The cross-sectional shape of the first receiving portion 112 is substantially semicircular. The second receiving portion 114 has a substantially rectangular cross-section. The first receiving portion 112 is used to receive the optical cable 200. The second receiving portion 114 is used to receive the plurality of first optical fibers 201 extending from the optical cable 200.

The cover 20 covers the receiving groove 11 to fix the optical cable 200. In the illustrated embodiment, the cover 20 is rotationally connected to the base 10. It can be understood that, in other embodiments, the cover 20 may be fixed on the base 10 by interference fit or a latching mechanism.

In the illustrated embodiment, the optical cable fixture 100 further includes a first magnetic member 30. The base 10 further includes a mounting hole 13. The first magnetic member 30 is installed in the mounting hole 13. The first magnetic member 30 is used to attract and fix the cover 20.

In the illustrated embodiment, the optical cable fixture 100 further includes a pressing block 40. The pressing block 40 is provided on the cover 20. After the cover 20 is placed on the base 10, the pressing block 40 protrudes into the second receiving portion 114 and presses the plurality of first optical fibers 201.

Figure 2:
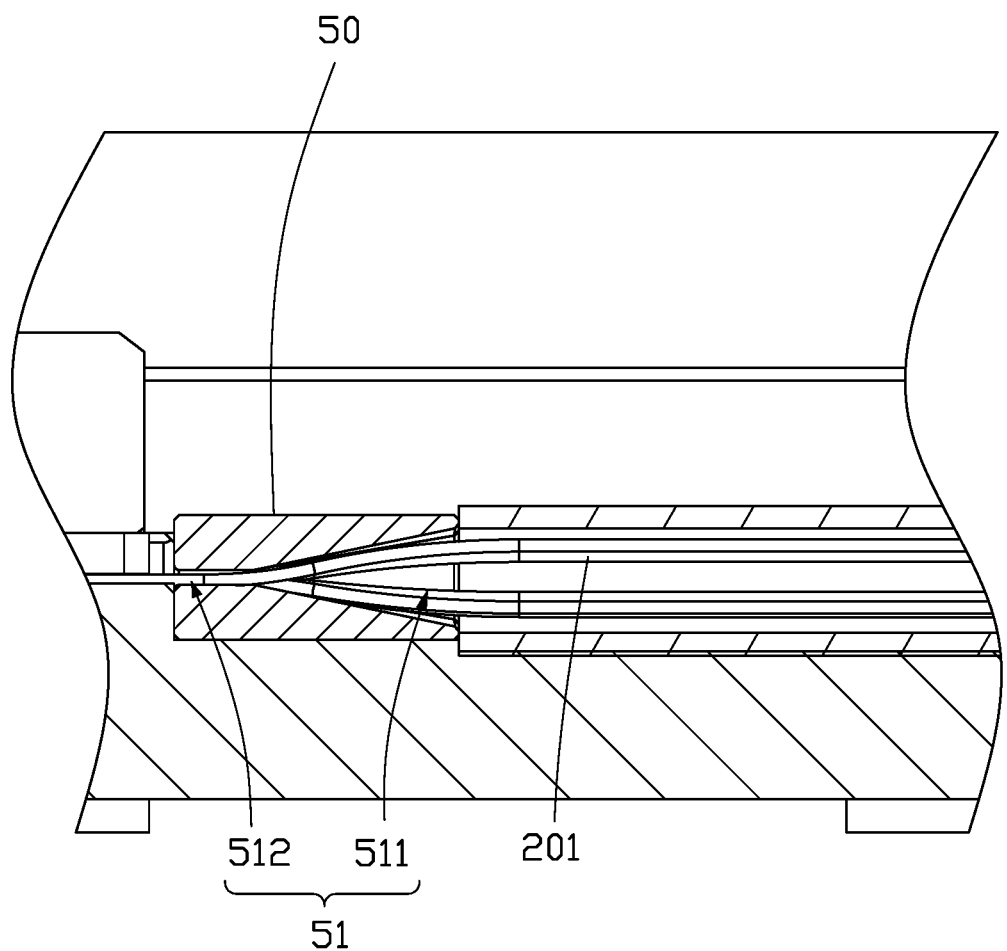
FIG. 2 is a cross-sectional view of a sorting member and the optical cable of the optical cable fixture taken along line II-II in FIG. 1.

Please refer to FIG. 2. In the illustrated embodiment, the optical cable fixture 100 further includes a sorting member 50. The sorting member 50 defines a through hole 51. The through hole 51 includes an accommodating portion 511 and a sorting portion 512 that communicate with each other. The accommodating portion 511 is adjacent to the first receiving portion 112, and the sorting portion 512 is adjacent to the second receiving portion 114. The cross-section of the accommodating portion 511 is tapered. The size of the end of the accommodating portion 511 away from the sorting portion 512 is larger than the size of the end of the accommodating portion 511 communicating with the sorting portion 512 to facilitate insertion of the first optical fibers 201. The size of the sorting portion 512 is such that the first optical fibers 201 are limited in a parallel arrangement.

Specifically, the height of the sorting portion 512 is approximately equal to the diameter of one first optical fiber 201.

In the illustrated embodiment, the receiving groove 11 further includes a third receiving portion 116. The first receiving portion 112 and the second receiving portion 114 communicate with both ends of the third receiving portion 116, respectively. The third receiving portion 116 is used to receive the sorting member 50.

Figure 3:
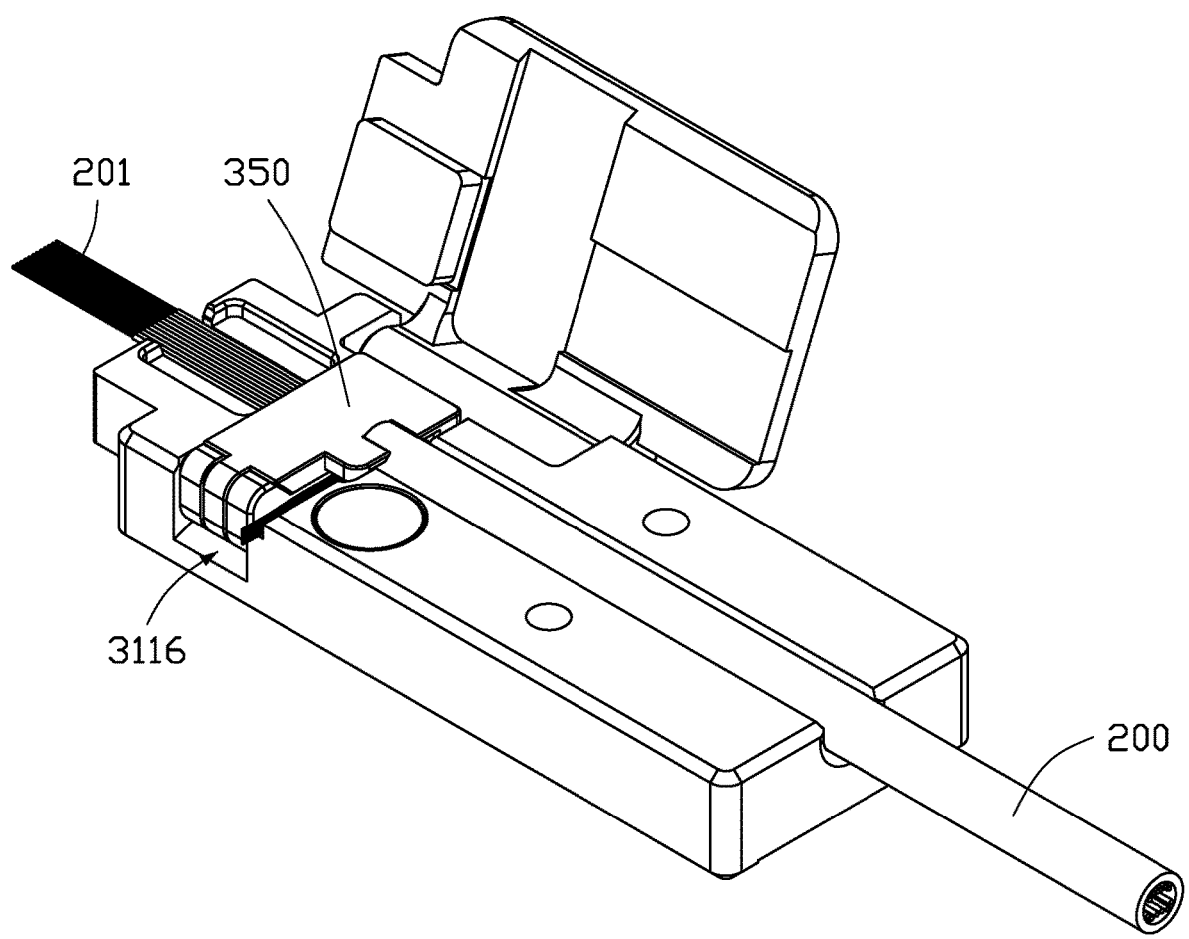
FIG. 3 is a schematic perspective view of an optical cable fixture and an optical cable according to a second embodiment.
Figure 4:
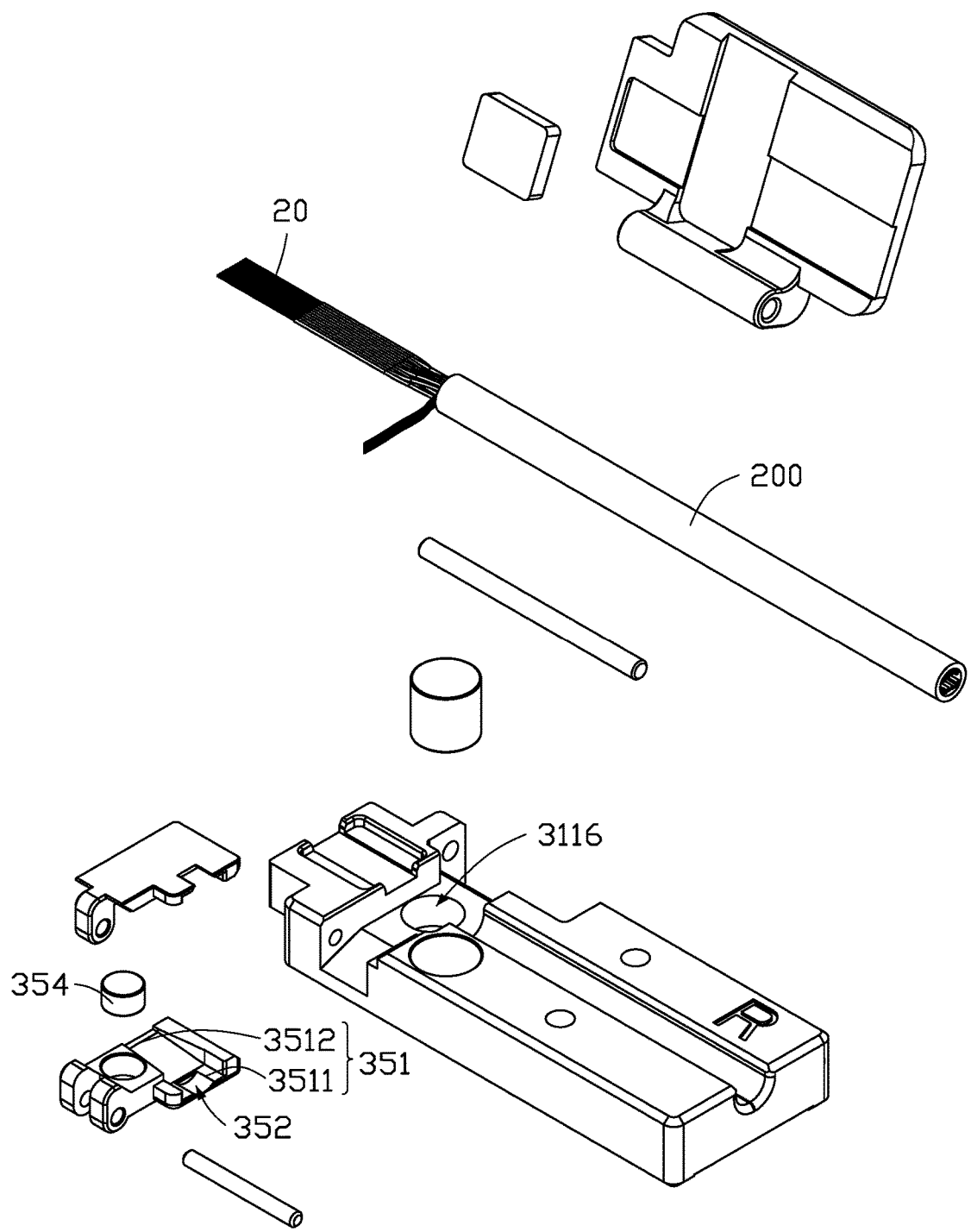
FIG. 4 is an exploded schematic view of the optical cable fixture shown in FIG. 3.
Figure 5:
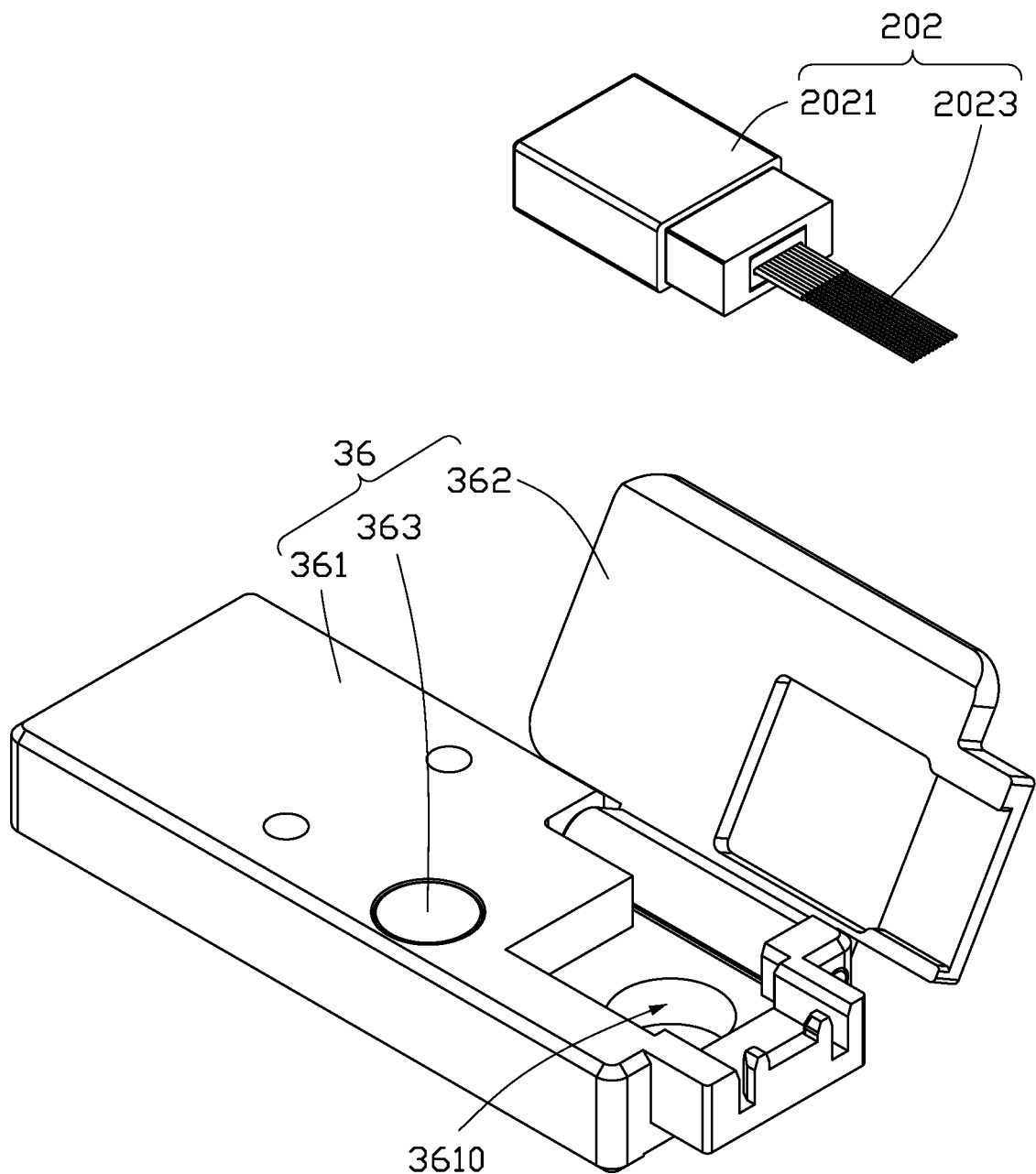
FIG. 5 is a perspective schematic view of a ferrule fixture for the optical cable fixture according to the second embodiment.

Referring to FIGS. 3-5, a second embodiment of the present disclosure provides an optical cable fixture 300. The optical cable fixture 300 is used to fix an optical cable 200. The optical cable 200 includes a plurality of first optical fibers 201.

The optical cable fixture 300 of the second embodiment is substantially similar to the optical cable fixture 100 of the first embodiment, and similar names are used to describe components in the second embodiment with respect to the first embodiment. The optical cable fixture 300 includes a base and a cover. The base defines a receiving groove. The receiving groove includes a first receiving portion, a third receiving portion 3116, and a second receiving portion.

The optical cable fixture 300 of the second embodiment is different from the optical cable fixture 100 of the first embodiment in that:

The optical cable fixture 300 of the second embodiment includes a sorting member 350. The sorting member 350 is rotationally received in the third receiving portion 3116. The sorting member 350 includes a first fixing portion 352 and a second fixing portion 353. The second fixing portion 353 is rotationally connected to the first fixing portion 352. The second fixing portion 353 and the first fixing portion 352 cooperatively define a through hole 351. The through hole 351 includes an accommodating portion 3511 and a sorting portion 3512 that communicate with each other. The size of the accommodating portion 3511 is larger than the size of the sorting portion 3512. The accommodating portion 3511 has a tapered cross-section. The size of the end of the accommodating portion 3511 away from the sorting portion 3512 is larger than the size of the end of the accommodating portion 3511 communicating with the sorting portion 3512. The height of the sorting portion 3512 is approximately equal to the diameter of one first optical fiber 201.

The sorting member 350 further includes a second magnetic member 354. The second magnetic member 354 is disposed on the first fixing portion 352 and used to attract the second fixing portion 353 for fixing.

The optical cable fixture 300 of the second embodiment further includes a ferrule fixture 360. The ferrule fixture 360 is used to fix a ferrule assembly 202. The ferrule assembly 202 includes a connector 2021 and a plurality of second optical fibers 2023 connected to the connector 2021.

The ferrule fixture 360 includes a fixing base 361 and a top cover 362. The fixing base 361 defines an accommodating hole 3610 to receive the connector 2021. The top cover 362 is covered on the fixing base 361 to fix the connector 2021. In the illustrated embodiment, the top cover 362 is rotationally connected to the fixing base 361. The ferrule fixture 360 further includes a third magnetic member 363. The third magnetic member 363 is disposed on the fixing base 361 and used to attract and fix the top cover 362.

Figure 6:
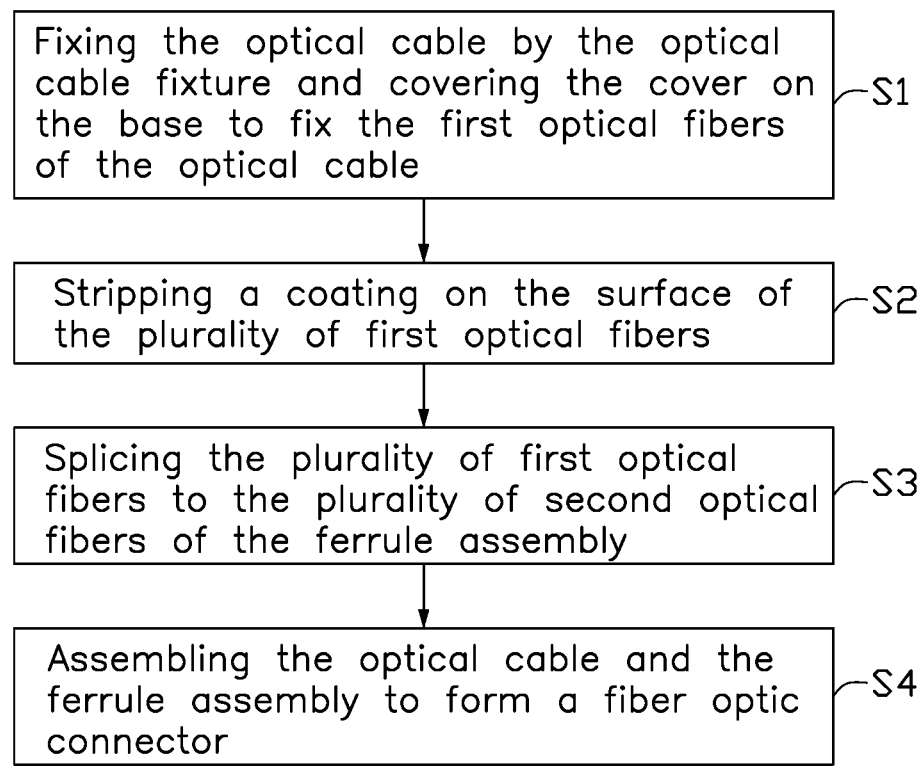
FIG. 6 is a flowchart of a fiber optic connector manufacturing method according to an embodiment.

FIG. 6 shows a flowchart of an embodiment of the present disclosure of a fiber optic connector manufacturing method. In one embodiment, the fiber optic connector is a multi-fiber push on (MPO) connector.

Referring to FIG. 1, at block S1, the optical cable 200 is fixed by the optical cable fixture 100, and the cover 20 is covered on the base 10 to fix the plurality of first optical fibers 201 of the optical cable 200.

Referring to FIGS. 1 and 2, in at least one embodiment, when the optical cable 200 is fixed, the sorting member 50 in the first embodiment sorts the plurality of first optical fibers 201. In the first embodiment, after the first optical fibers 201 are spliced, the sorting member 50 is fixed on the first optical fibers 201.

Referring to FIGS. 3 and 4, in at least one embodiment, when the optical cable 200 is fixed, the sorting member 350 in the second embodiment sorts the plurality of first optical fibers 201. After rotationally separating the first fixing portion 352 and the second fixing portion 353, the plurality of first optical fibers 201 are arranged side-by-side between the first fixing portion 352 and the second fixing portion 353, and then the first fixing portion 352 and the second fixing portion 353 are closed, so that the second fixing portion 353 fixes the plurality of first optical fibers 201. In the second embodiment, after the first optical fibers 201 are spliced, the sorting member 350 is separated from the first optical fibers 201.

In at least one embodiment, after manually arranging the plurality of first optical fibers 201 in the second receiving portion 114, the cover 20 is covered on the base 10 to fix the optical cable 200 and the plurality of first optical fibers 201.

At block S2, a coating on the surface of the plurality of first optical fibers 201 is stripped.

In one embodiment, stripping is performed by a peeling device such as hot peeling pliers. Since the optical cable fixture 100 sorts and fixes the plurality of first optical fibers 201, it is sufficient to directly place the plurality of first optical fibers 201 into the stripping device for stripping.

Figure 7:
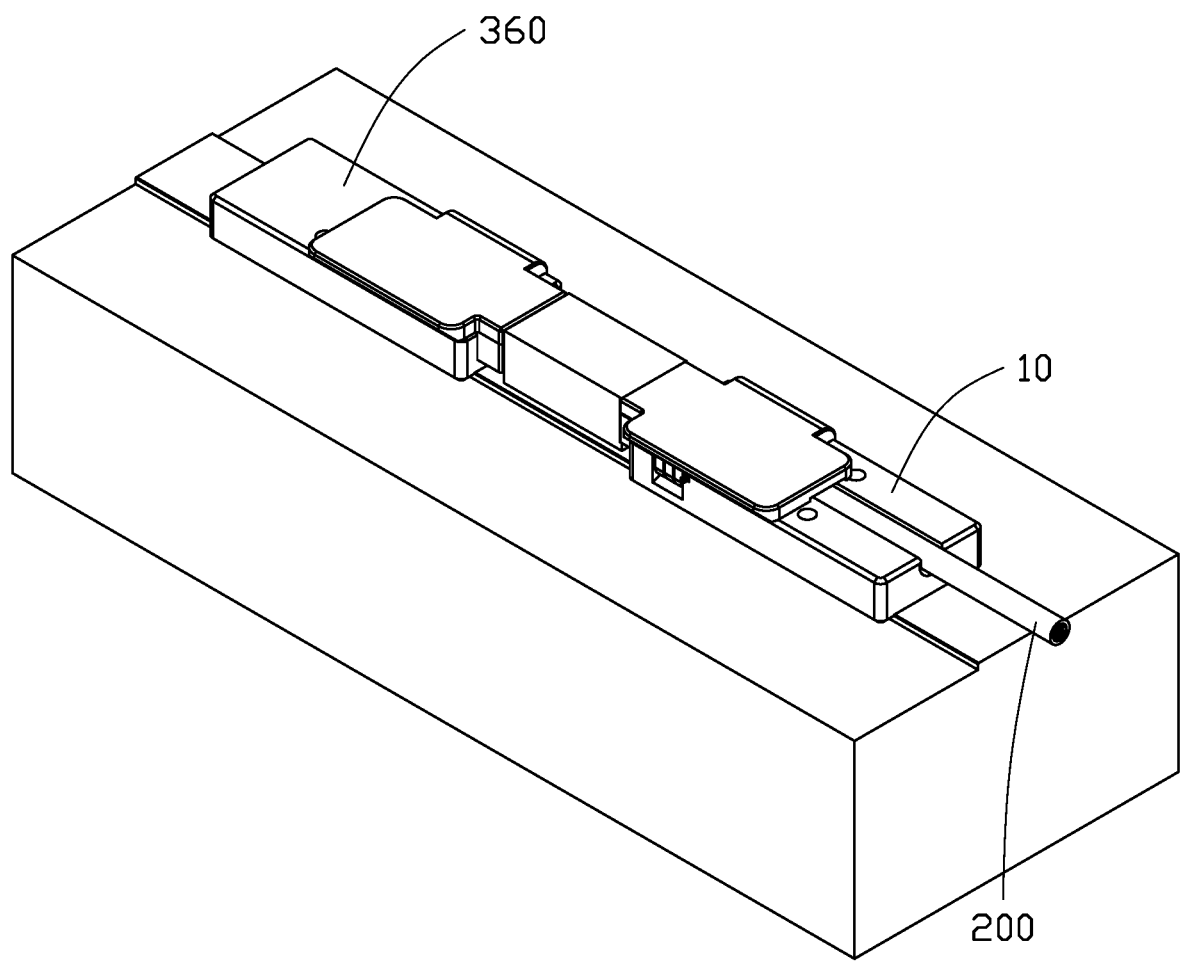
FIG. 7 is a schematic perspective view of the optical cable and a ferrule assembly spliced together.

Referring to FIG. 7, at block S3, the plurality of first optical fibers 201 are spliced to the plurality of second optical fibers 2023 of the ferrule assembly 202.

In one embodiment, the plurality of first optical fibers 201 and the plurality of second optical fibers 2023 are spliced by a fusion splicer.

Figure 8:
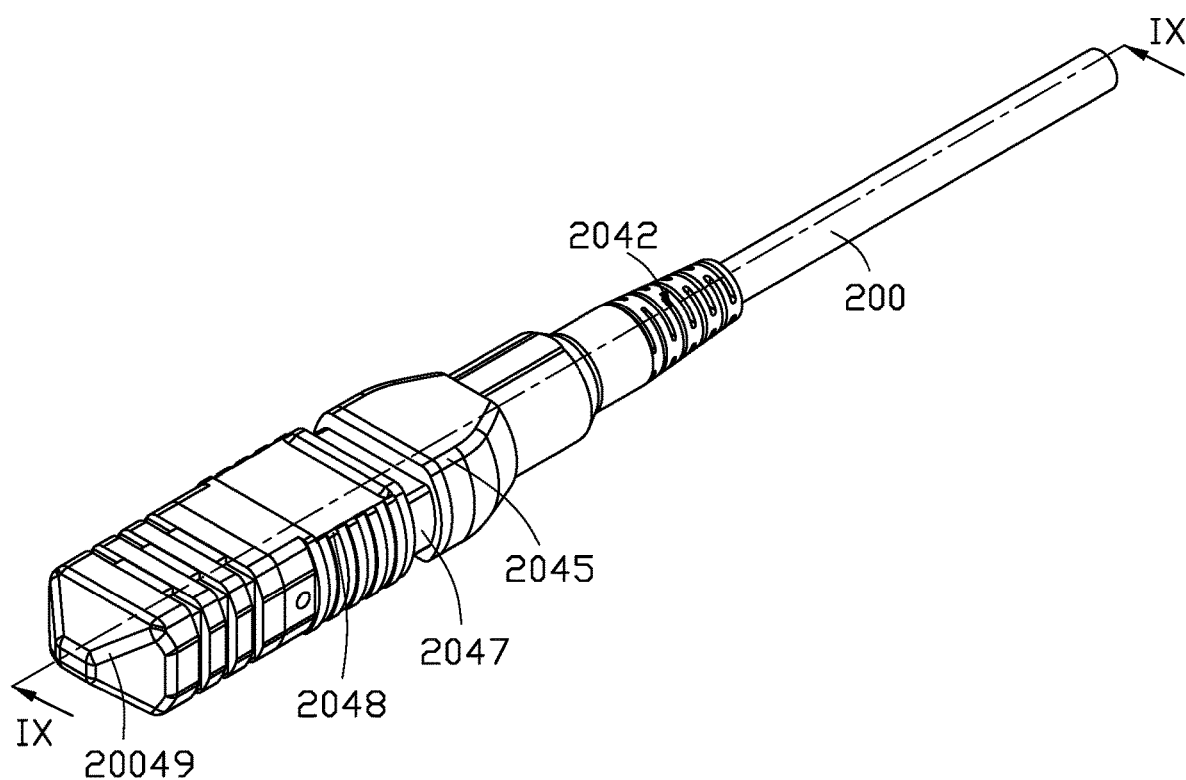
FIG. 8 is a schematic perspective view of a fiber optic connector.
Figure 9:
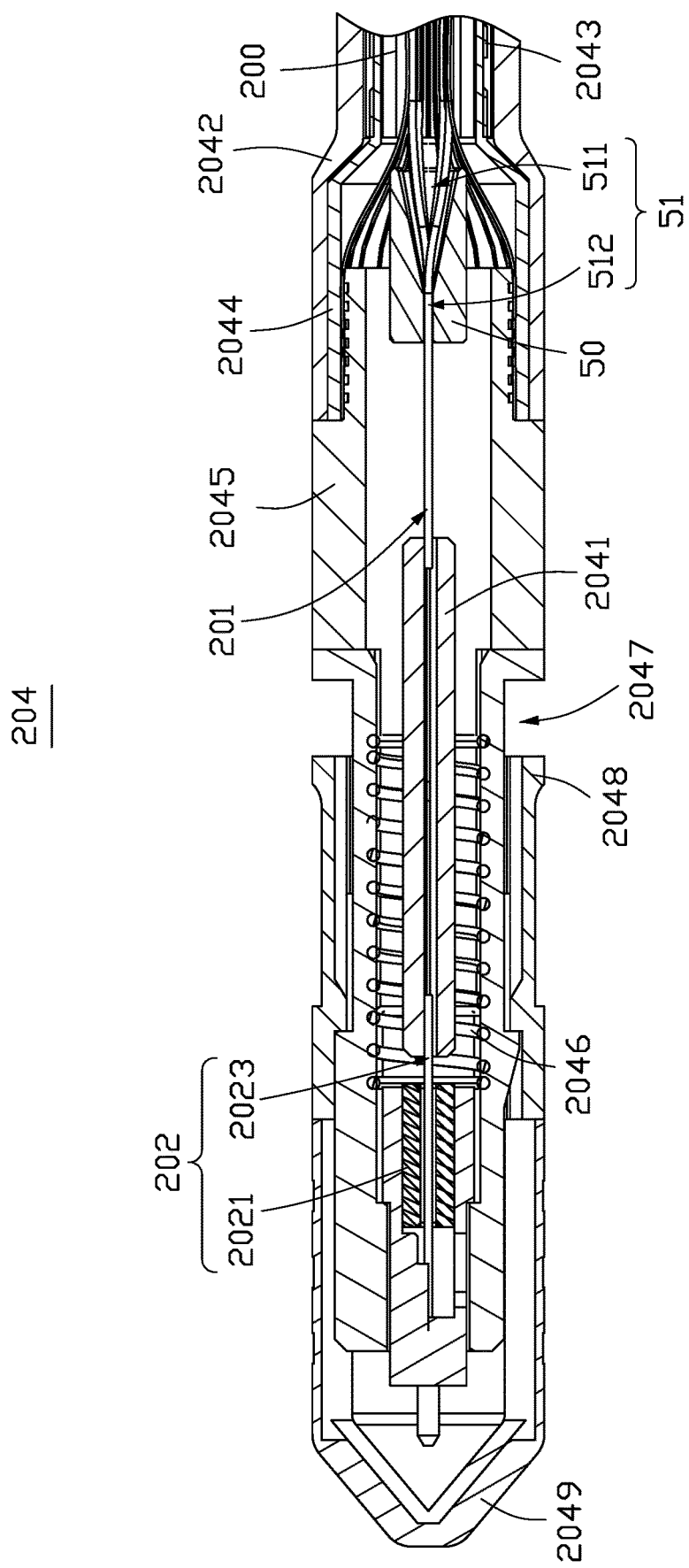
FIG. 9 is a schematic cross-sectional view of the fiber optic connector taken along line IX-IX in FIG. 8.

Referring to FIGS. 8 and 9, at block S4, the optical cable 200 and the ferrule assembly 202 are assembled to form a fiber optic connector 204.

Assembling the optical cable 200 and the ferrule assembly 202 to form the fiber optic connector 204 specifically includes:

Sleeving a sheath 2042, a heat-shrinkable tube 2043, a riveting ring 2044, a rear shell 2045, and a first resilient member 2046 in sequence on the optical cable 200, two ends of the first resilient member 2046 respectively elastically abutting the connector 2021 and the rear shell 2045, one end of the riveting ring 2044 connected to the rear shell 2045, the heat-shrinkable tube 2043 fastened on the riveting ring 2044 and the optical cable 200, and the sheath 2042 covered on the riveting ring 2044 and the heat-shrinkable tube 2043;

Wrapping a protective shell 2041 over the first optical fibers 201 and the second optical fibers 2023;

Covering a first housing 2047 on the ferrule assembly 202 and connecting the first housing 2047 to the rear shell 2045;

Slidably mounting a second housing 2048 on the first housing 2047, the second housing 2048 elastically abutting the first housing 2047 through a second resilient member (not shown);

Mounting a dust cap 2049 on the second housing 2048.

It can be understood that, in other embodiments, the assembled parts can be modified according to the type of fiber optic connector to be manufactured.

FIGS. 8 and 9 show an embodiment of the present disclosure of a fiber optic connector 204 that is manufactured by the fiber optic connector manufacturing method.

The fiber optic connector 204 includes an optical cable 200 and a ferrule assembly 202. The optical cable 200 includes a plurality of first optical fibers 201. The ferrule assembly 202 includes a connector 2021 and a plurality of second optical fibers 2023. The first optical fibers 201 are spliced with the second optical fibers 2023.

The fiber optic connector 204 further includes a sorting member 50. The sorting member 50 is provided with a through hole 51. The through hole 51 includes an accommodating portion 511 and a sorting portion 512. The first optical fibers 201 pass through the through hole 51 and are sorted by the sorting portion 512 of the sorting member 50.

The fiber optic connector 204 further includes a sheath 2042, a heat-shrinkable tube 2043, a riveting ring 2044, a rear shell 2045, and a first resilient member 2046. Two ends of the first resilient member 2046 elastically abut the connector 2021 and the rear shell 2045, respectively. One end of the riveting ring 2044 is connected to the rear shell 2045. The heat-shrinkable tube 2043 is fastened on the riveting ring 2044 and the optical cable 200. The sheath 2042 covers the riveting ring 2044 and the heat-shrinkable tube 2043.

The fiber optic connector 204 further includes a protective shell 2041. The protective shell 2041 covers the first optical fibers 201 and the second optical fibers 2023. The fiber optic connector 204 further includes a first housing 2047. The first housing 2047 is placed on the ferrule assembly 202 and connected to the rear shell 2045. The fiber optic connector 204 further includes a second housing 2048. The second housing 2048 is slidably mounted on the first housing 2047 and elastically abuts the first housing 2047 through a second resilient member.

The fiber optic connector 204 further includes a dust cap 2049. The dust cap 2049 is mounted on the second housing 2048.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An optical cable fixture for sorting and stripping an optical fiber ribbon, the optical cable fixture comprising:
   a base;
   a cover; and
   a sorting member; wherein:
   the base defines a receiving groove penetrating opposite sides of the base;
   the receiving groove comprises a first receiving portion and a second receiving portion;
   the first receiving portion receives an optical cable;
   the second receiving portion receives a plurality of first optical fibers extending from the optical cable;
   the cover covers the base and fixes the optical cable and the plurality of first optical fibers;
   the sorting member is received in the receiving groove and defines a through hole, the through hole comprises an accommodating portion and a sorting portion, a size of the accommodating portion is larger than a size of the sorting portion, the accommodating portion is for inserting the plurality of first optical fibers, and the sorting portion is for sorting the plurality of first optical fibers.

2. The optical cable fixture of claim 1, further comprising a first magnetic member mounted on the base and configured to attract and fix the cover, wherein:
   the cover is rotationally coupled to the base.

3. The optical cable fixture of claim 1, further comprising a pressing block mounted on the cover and configured to protrude into the second receiving portion and press the plurality of first optical fibers.

4. The optical cable fixture of claim 1, wherein:
   the receiving groove further comprises a third receiving portion for receiving the sorting member;
   the first receiving portion and the second receiving portion communicate with both ends of the third receiving portion, respectively.

5. The optical cable fixture of claim 4, wherein:
   the sorting member comprises a first fixing portion and a second fixing portion;
   the second fixing portion is rotationally coupled to the first fixing portion; and
   the through hole is cooperatively defined by the first fixing portion and the second fixing portion.

6. The optical cable fixture of claim 1, further comprising a ferrule fixture, wherein:
   the ferrule fixture comprises a fixing base and a top cover;
   the fixing base defines an accommodating hole for receiving a connector of a ferrule assembly; and
   the top cover covers the fixing base for fixing the connector.

7. A fiber optic connector manufacturing method comprising:
   fixing an optical cable and a plurality of first optical fibers of the optical cable by an optical cable fixture;
   stripping a coating on the surface of the plurality of first optical fibers;
   providing a ferrule assembly comprising a connector and a plurality of second optical fibers, and splicing the plurality of first optical fibers to the plurality of second optical fibers; and
   assembling the optical cable and the ferrule assembly to form the fiber optic connector;
   wherein a method of fixing the optical cable and the plurality of first optical fibers by the optical cable fixture comprises:
   providing a sorting member defining a through hole, the through hole comprising an accommodating portion and a sorting portion, a size of the accommodating portion larger than a size of the sorting portion, the plurality of first optical fibers inserted into the accommodating portion and sorted through the sorting portion.

8. A fiber optic connector comprising:
   an optical cable comprising a plurality of first optical fibers;
   a ferrule assembly comprising a connector and a plurality of second optical fibers; and
   a sorting member; wherein:
   the plurality of first optical fibers is spliced to the plurality of second optical fibers;
   the sorting member defines a through hole, the through hole comprises an accommodating portion and a sorting portion, a size of the accommodating portion is larger than a size of the sorting portion, the accommodating portion is for inserting the plurality of first optical fibers, and the sorting portion is for sorting the plurality of first optical fibers.

9. The fiber optic connector of claim 8, further comprising a sheath, a heat-shrinkable tube, a riveting ring, a rear shell, and a first resilient member;

two ends of the first resilient member elastically abut the connector and the rear shell, respectively;

one end of the riveting ring is connected to the rear shell;

the heat-shrinkable tube is fastened on the riveting ring and the optical cable; and the sheath covers the riveting ring and the heat-shrinkable tube.

10. The fiber optic connector of claim 9, further comprising a protective shell, a first housing, and a second housing, wherein:

the protective shell covers the plurality of first optical fibers and the plurality of second optical fibers;

the first housing is placed on the ferrule assembly and connected to the rear shell; and the second housing is slidably mounted on the first housing and elastically abuts the first housing.

11. The fiber optic connector of claim 10, further comprising a dust cap mounted on the second housing.

* * * * *